United States Patent [19]

Eriksson

[11] Patent Number: 5,174,424
[45] Date of Patent: Dec. 29, 1992

[54] ARRANGEMENT IN SCREW THREAD CUTTING APPARATUS

[75] Inventor: Alf Eriksson, Nacka, Sweden

[73] Assignee: Tapmatic International Corporation (TIC AG), Kriessern, Switzerland

[21] Appl. No.: 630,394

[22] Filed: Dec. 18, 1990

Related U.S. Application Data

[63] Continuation of Ser. No. 287,030, Dec. 21, 1988, abandoned.

[30] Foreign Application Priority Data

Oct. 13, 1988 [SE] Sweden .................. 8803637

[51] Int. Cl.⁵ .............................. F16D 43/20
[52] U.S. Cl. .................. 192/56 R; 192/138; 192/143
[58] Field of Search ............ 192/56 R, 138, 143

[56] References Cited

U.S. PATENT DOCUMENTS

| | | | |
|---|---|---|---|
| 1,953,182 | 4/1934 | Lyon | 192/56 R |
| 2,775,327 | 12/1956 | Gearhart | 192/56 R |
| 2,940,571 | 6/1960 | Bernhard | 192/56 R |
| 3,032,156 | 5/1962 | Eriksson | 192/56 R |
| 3,884,334 | 5/1975 | Eriksson | 192/56 R |
| 4,041,729 | 8/1977 | Bilz | 192/56 R X |
| 4,599,019 | 7/1986 | Ueberall | 192/56 R X |
| 4,655,103 | 4/1987 | Schreiber et al. | 192/56 R X |
| 4,694,944 | 9/1987 | Schmidt | 192/56 R |

Primary Examiner—Richard Lorence
Assistant Examiner—Nicholas Whitelaw
Attorney, Agent, or Firm—Joseph R. Evanns

[57] ABSTRACT

The invention is an apparatus for producing clutching and de-clutching particularly adaptable for use in a tapping attachment for threading holes. The clutching apparatus includes clutching members driven by the driver or driving machine and clutching members carried by the driven part. An intermediate member is provided which provides for clutching engagement and de-clutching between the members on the driving part and the members on the driven part. The clutching apparatus has the capability of producing de-clutching in response to excessive torque applied to the apparatus, and also, it has the capability of producing de-clutching in response to the tap having reached a predetermined depth and the hole being tapped. The apparatus can be built into a tapping attachment or into a tap holding adapter having the capability of quick change release, and also, the mechanism can be built directly into the driving apparatus.

31 Claims, 6 Drawing Sheets

ARRANGEMENT IN SCREW THREAD CUTTING APPARATUS

This is a continuation of copending application Ser. No. 07/287,030 filed on Dec. 21, 1988 now abandoned.

The present invention relates to an arrangement in screw thread cutting apparatus of the kind which includes a driving part, a driven part and clutch elements which are disposed between said parts and which have provided thereon torque transmitting means which are in mutual engagement when torque is transmitted between the parts and which when a predetermined state is reached between the driving and the driven apparatus parts are moved out of engagement with one another against the bias of a spring by axial displacement of an intermediate clutch member.

It is known from, e.g., U.S. Pat. Nos. 3,032,156 and 3,884,334 to disengage torque transmission with the aid of arrangements of the aforesaid kind, in order to protect the screw tap against fracture in screw thread cutting apparatus when there is reached a predetermined torque which must be chosen lower than the breaking moment of the tap, e.g. when cutting screw threads in not-readily worked materials.

It is also known to provide a slipping clutch arrangement which will disengage the torque transmission when a given desired depth of thread has been reached, irrespective of the strain on the screw tap or the type of screw-threaded hole concerned, this slipping clutch arrangement often being used solely for this purpose.

The main object of the present invention is to provide an arrangement in screw thread cutting apparatus which will enable both of the aforedescribed functions to be accomplished in one and the same clutch arrangement, i.e. the tap is protected against fracture from two different causes, namely against torque which exceeds the breaking moment of the tap or by releasing clutch engagement when the tap has reached a given depth of screw thread. This and other objects are achieved with an arrangement constructed in accordance with the invention and having the characteristic features set forth in the following claims.

The invention will now be described in more detail with reference to exemplifying embodiments thereof illustrated in the accompanying drawings.

Figure 1A:
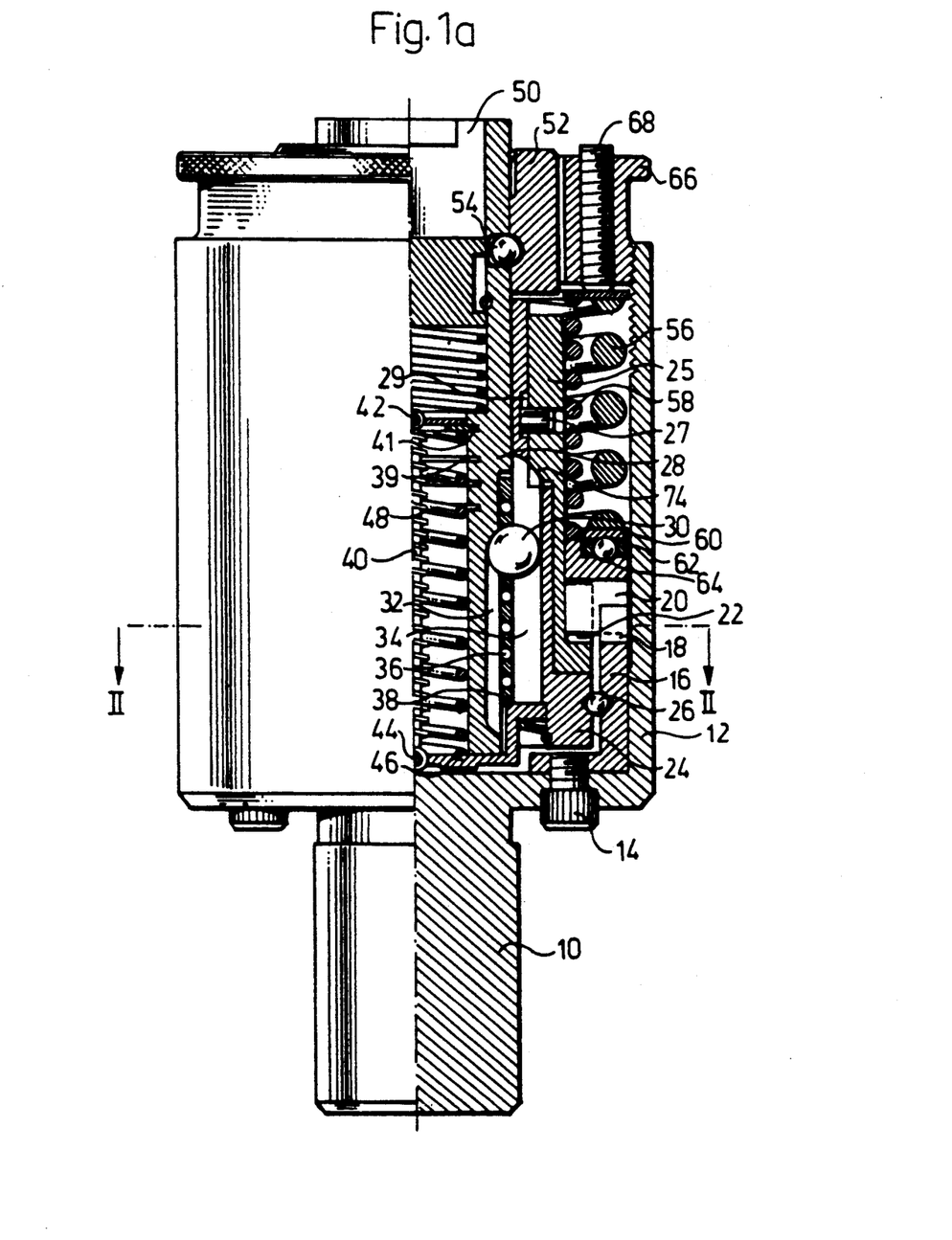
FIGS. 1a and 1b are longitudinal sections through a screw thread cutting apparatus provided with an inventive clutch arrangement.
Figure 1B:
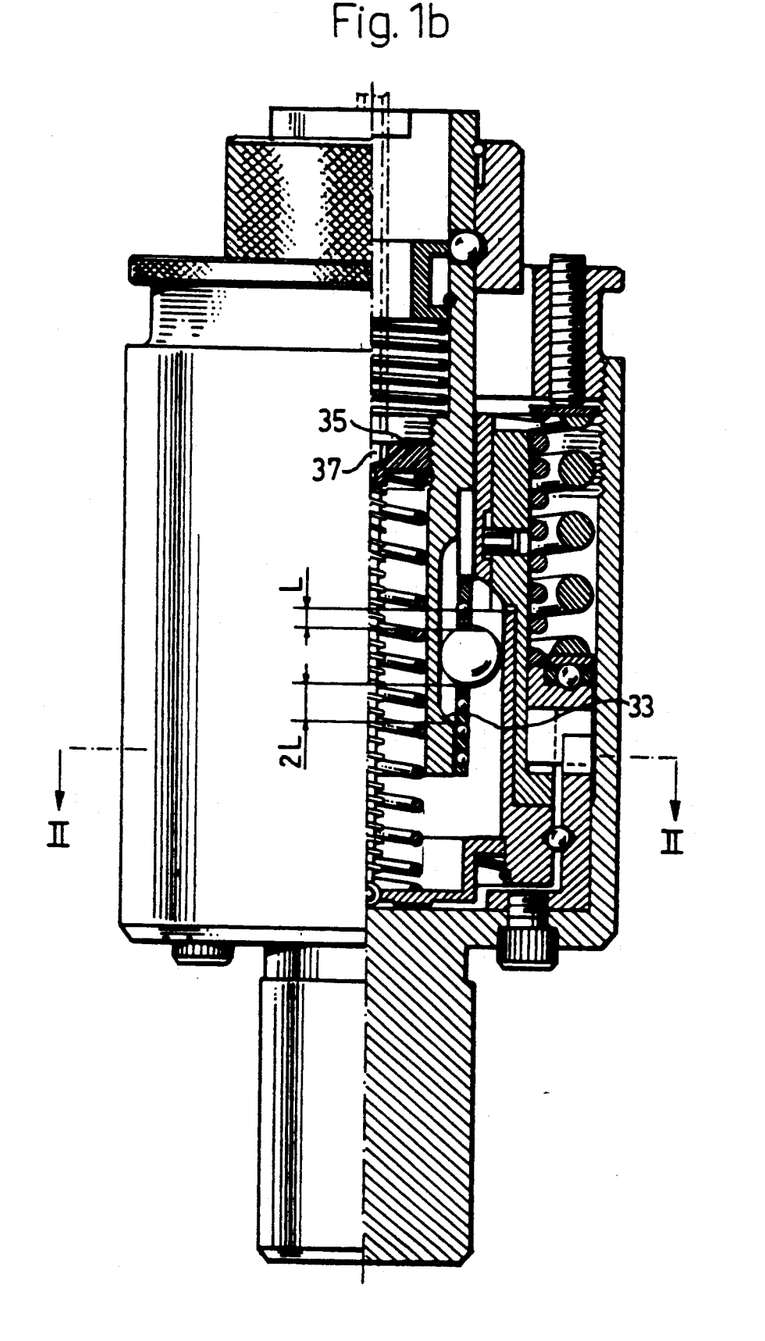

The screw thread cutting apparatus illustrated in FIG. 1 comprises a drive spindle 10 which merges with a sleeve-like part 12. Attached to the inner surface of the sleeve-like part 12 with the aid of screws 14 is a sleeve 16 the forward end of which, as seen in the apparatus feed direction, has provided thereon dogging members 18 which are intended for engagement with dogging members 22 on the driven part through the intermediary of an intermediate clutch element or annular element 20, as described in more detail herebelow. A guide body 24 is journalled in the sleeve 16 with the aid of balls 26 which engage in grooves in the sleeve 16 and the guide body 24 such as to enable the guide body to rotate in the sleeve 16 while being held against axial movement therein. Journalled internally of the guide body 24 is a cylindrical sliding body 28 which is arranged for limited axial movement relative to the guide body 24 but non-rotatably connected thereto, as described in more detail herebelow. Slideably mounted externally around the guide body is a clutch body 25 which is non-rotatably connected to the guide body but axially movable relative thereto and which carries the aforesaid dogging members 22. The extent to which the clutch body 25 can move axially in relation to the guide body 24 is determined by a pin 27 which engages in an outer, axially extending groove 29 in the guide body 24. The guide body 24, the clutch body 25 and the sliding body 28 together form the driven part of the screw thread cutting apparatus. In this case, transmission of the drive between the guide body and the slide body 28 is effected with the aid of balls 30 which are mounted in an outer axially extending groove 32 and the slide body 28 and a corresponding inner axially extending groove 34 in the guide body 24. Journalling between the guide body 24 and the slide body 28 is effected with the aid of a large number of small balls 36 arranged in a keeper 38 which has openings for the balls 30. For the purpose of balancing axial movement of the slide body 28, the body is suspended on a helical spring 40 which is arranged in a central bore in the body 28 and held tensioned between a lower holder 42 and an upper pin 44 fitted to a cap-like element 46 mounted on the guide body 24. Also mounted between this last mentioned element 46 and the locking ring 41 (FIG. 1a) or the setting screw 35 (FIG. 1b) is a spring 48 which surrounds the spring 40 and which is more powerful than said spring 40. The slide body 28 has provided on its free end a bore 50 and a slide sleeve 52 for accommodating a screw tap holder (not shown) in a known manner.

When the drive spindle 10 rotates torque is transmitted from the dogging members 18 on the sleeve 16, through the intermediate annular element 20 and to the dogging members 22 on the clutch body 25, and therewith to the guide body 24 via the pin 27. During this torque transmission, the annular element 20 is urged into engagement with the dogging members 18, 22 by two mutually concentrical springs 56, 58 of different strengths, of which the more powerful spring, the spring 56 in the case of the illustrated embodiment, exerts a force on the annular element 20 via an intermediate circular plate 60 and ball cage 62 and balls 64, so as to reduce the friction between the springs and the annular element 20. The weaker spring 58 slides against the inner lip of the annular element and when the clutch is released or disengaged will generate a weak frictional force which is operative in maintaining the annular element 20 free from load until rotation of the machine spindlle has ceased and the direction of rotation is subsequently reversed, this course of events being described in more detail hereinafter with reference to FIGS. 4a and 4b. The ends of the springs 56, 58 distal from the annual element 20 abut a setting screw 66 which is screwed into a screw-threaded hole, such that the force exerted by the spring can be adjusted by screwing the screw 66 into or out of the sleeve 12. The screw 66 is locked in its positional setting with the aid of a further screw 68 which acts against a slot in the setting screw 66 and is screw-threaded therein.

Figure 2:
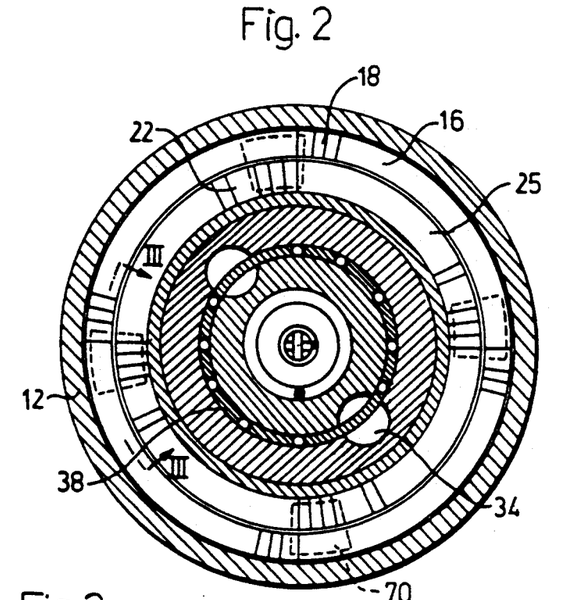
FIG. 2 is a sectional view taken on the line II—II in FIG. 1a and illustrating schematically the mutual engagement of the torque transmitting means of the parts.
Figure 3A:
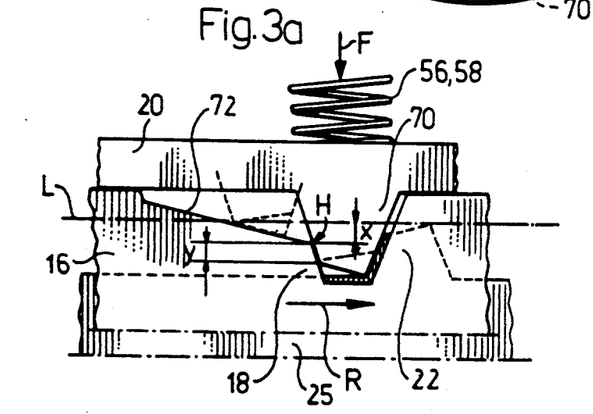
FIGS. 3a and 3b are sectional views, in larger scale, of the clutch of FIG. 2 taken on the line III—III, and show different states of clutch engagement.
Figure 3B:
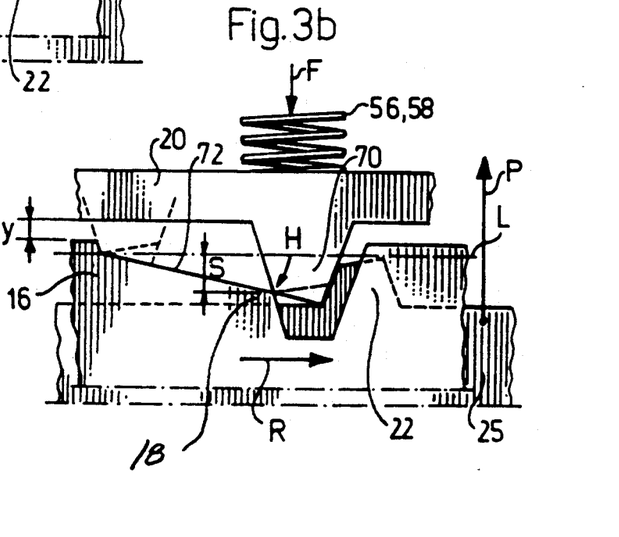

The screw thread cutting apparatus described above with reference to FIGS. 1 and 2 has two functions, namely that the driving and driven parts of the apparatus are mutually disengaged either when a predetermined torque is exceeded or when a predetermined screw depth has been reached. These apparatus functions will now be described with reference to FIGS. 3a and 3b. FIG. 3a illustrates disengagement of said parts when an excessive torque is reached, and FIG. 3b illustrates similar disengagement caused when reaching a preset depth of thread.

When cutting a screw thread in a blind hole with the screw tap (not shown) inserted in the hole 50 and the tap reaches the bottom of the hole, the body 28 is stopped from rotating, and therewith also the guide body 24 and the clutch body 25. As a result, the torque which has been preset through the spring force F will be exceeded, as illustrated in FIG. 3a in which Y indicates the engagement between the dogging member 18 on the driving part 16 and the dogging member 70 on the annular element 20. In a first phase of operation, the dogging member 18 on the driving part 16 continues to move in the screw-threading direction, designated R in the FIGS. 3a, 3b and the driving side-surface of said member 18 presses the intermediate annular element 20 through the distance Y against the force F of the clutch spring or springs 56, 58. When the shoulder or dogging member 70 of the annular element 20 has reached the corner H, the pressure is transferred to the top surfaces of the dogging members and in a second phase of operation the annular element is lifted further through a distance X by the ramp surface 72 on the driving part 16 while twisting the clutch parts relative to one another at the same time. When the dogging member on the annular element 20 reaches the position indicated by chain line L, the driven part 25 is disengaged from the drive torque and is thus relieved of all load.

In FIG. 1a the screw thread cutting apparatus is shown with the slide body 28 in its rearmost position in the guide body 24, with the collaring or abutment spring 48 compressed. This operational state of the apparatus is occurrent solely on certain occasions and it exhibits maximum rearward movement as a protection against the tab fracturing as a result of continuing pressure, or alternatively maximum free axially forward movement of the tap when so desired, e.g. in the case of restricted feed in the machine. The relative measurements of the apparatus components are also best seen in this operational state of the apparatus.

FIG. 1b shows the apparatus in a normal starting and operational state. The axial position of the slide body 28 in relation to the guide body 24 in a free state is determined by the force exerted by the collaring spring 48 and the tension spring 40. Since the collaring or abutment spring 48 is more powerful than the tension spring 40, as before mentioned, the slide body 28 will stop at its forwardly displaced position relative to the guide body 24, this state occurring when the mutually co-acting spring forces are in balance.

When the apparatus clutch is to be disengaged because a preset depth of thread has been reached, axial feed of the spindle is stopped, although the spindle will continue to rotate. The screw tap will therewith work further down into the hole to be screw-threaded under full driving torque from the clutch. At the same time, the screw tap will draw the slide body 28 further forwards. As will be seen from FIG. 1b, this takes place without true axial forces in the actual meaning thereof inhibiting downward feed of the tap; the occurrence of positive axially directed forces would press on the thread flanks and therewith cause excessive removal of material and result in a screw thread of uneven quality. The transmission of torque between the guide body 24 and the slide body 28 is effected over a roller body, in the case of the illustrated embodiment the ball 30, under the radial bearing of the balls 26, and consequently the relative axial movements of said parts will take place substantially in the absence of friction. This construction principle is well known; cf. for instance the aforementioned U.S. Pat. Nos. 3,032,156 and 3,884,334. Experience has proven their value as probably the best of the principles known hitherto in obtaining screw threads of the highest quality, because the screw tap is allowed to follow its own actual pitch.

The ball 30, which is pressed between the half-groove 34 of the guide body 24 and the half-groove 32 of the slide body 28, rolls through half the distance travelled by the slide body upon relative movement of these bodies. When the slide body 28 in FIG. 1 is drawn forward by the tap through a distance of 2 L and the ball 30 therewith rolls through the distance L, the ball 30 will reach the rear stop 33 in the half-groove 32 of the slide body 28 and at the same time strike forwardly against the abutment surface extending down into the outer end of the half-groove 34 in the guide body 24. Thus, the clutch body 25, which carries the dogging member of the driven part, is pressed further forwards, as indicated by the arrow P in FIG. 3b. The intermediate annular element 20 is herewith lifted further through the distance Y, although at the same time under the pressure of the dogging member 18 of the part 16 against the dogging member 70 of the annular element 20, which reduces the tension or pulling force. When the shoulder or dogging member 70 of the annular element 20 reaches the corner H, the pressure is transferred to the top surfaces of the dogging members and in another working phase the annular element 20 is lifted further along the ramp surface 72 on the driving part 16 through a distance S, during relative rotation of the clutch parts at the same time. When the dogging member 70 on the annular element 20 reaches the position L shown in chain lines, the driven part 25 is disengaged and therewith relieved of all torque and tensile load.

As will be seen from FIG. 1b, the outer ends of the collaring spring 48 and the tension spring 40 are seated against a flat setting screw 35 which can be turned from externally of the apparatus with the aid of an hexagonal key or a screw driver inserted in the cut-out 37. Rotation of the setting screw will result in a change in the tension of the springs and therewith a change in the axial position of the slide body 28 and the ball 30 relative to the abutment surface 74. This will enable the desired length of clutch-disengagement travel to be preset and will also enable the thread depth to be regulated with precision.

In accordance with an alternative embodiment, the slide body 28 as shown in FIG. 1a in its central bore may be configured with a plurality of grooves 39 for a lock ring 41 which functions as an abutment for the collaring spring. The extent of clutch travel to disengage the clutch can be changed, by moving the lock ring 41 from one groove to another.

Figure 4A:
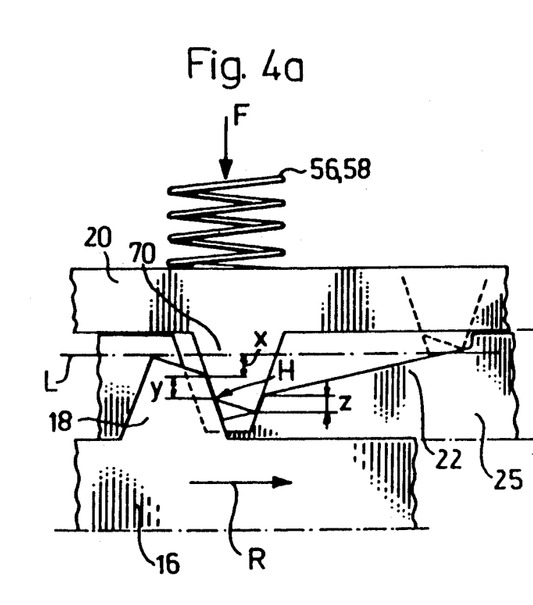
FIGS. 4a and 4b are sectional views similar to the views in FIGS. 3a and 3b but of a further embodiment of the inventive clutch, and show the clutch in mutually different states of engagement.
Figures 4B, 5:
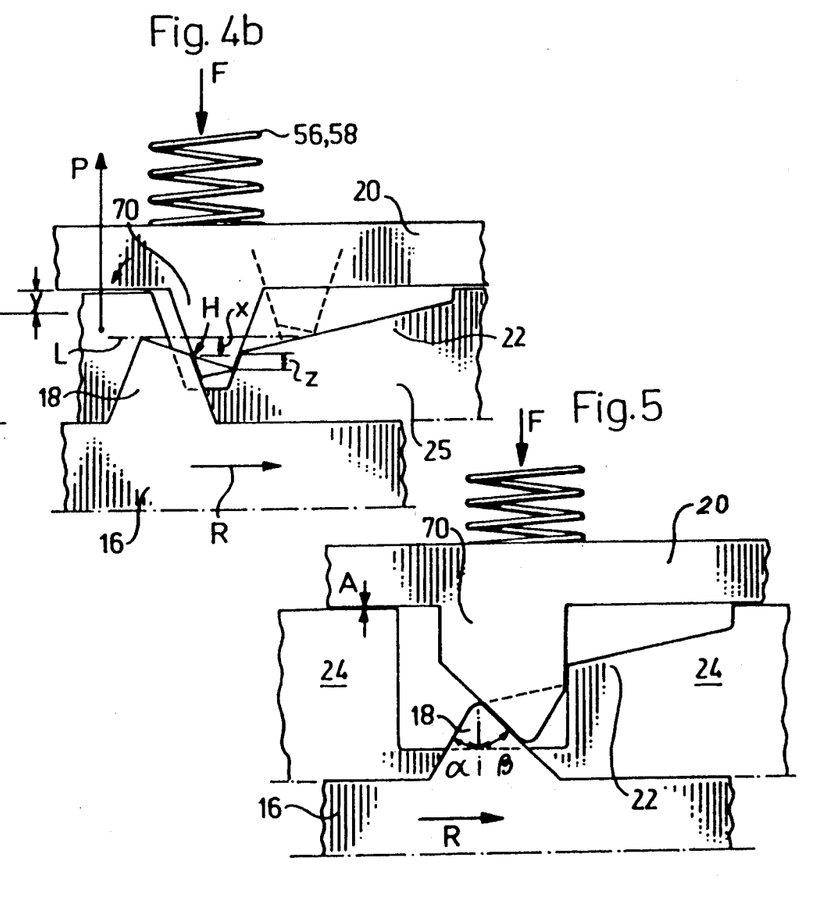
FIG. 5 is a sectional view similar to the views in FIGS. 3a and 3b and showing a changed configuration of the clutch teeth or dogging members.

Another embodiment of the clutch is illustrated in FIGS. 4a and 4b. FIG. 4a illustrates disengagement of the clutch when an excessively high torque prevails, whereas FIG. 4b illustrates clutch disengagement at a preset thread depth. In FIG. 4a, the reference sign Y identifies the engagement between the dogging member 70 of the annular element 20 and the dogging member 18 of the driving part 16, Z identifies the engagement between the dogging member 70 of the annular element 20 and the dogging member 22 on the driven part 25, whereas X identifies the rise of the top surface of the dogging member or shoulder 18 on said driving part. When the clutch is disengaged due to the occurrence of an excessively high torque, the driving sleeve 16 will continue to move forward in the screw threading direction, indicated by the arrow R, and the dogging member 18 on the sleeve 16 will first press up the annular element 20 through the distance Z against a spring force F until the corner H of the dogging member or shoulder 70 lies against a corner on the dogging member or shoulder 18. In the next phase, the top surface of the dogging member 18 of the driving part 16 lifts the annular element 20 further through the distance X against the spring force F, while simultaneously conveying the dogging member 70 on the annular element up the dogging member 22 on the driven part or clutch body 25, said dogging member 22 presenting an incline which forms a load relieving path or ramp. When the dogging member or shoulder 70 reaches the position shown in broken lines to the right in FIG. 4a above the chain-line position L, all torque on the dogging member has been relieved. In the case of this embodiment the load relieving path 22 is located on the driven part 25 instead of on the driving part, as in the case of the embodiment of FIGS. 3a, 3b, and the driven part 25 and the annular element 20 cease to rotate when the clutch is disengaged, whereas the driving part 16 continues to rotate. Provided that the driving part 16 continues to rotate in the aforesaid drive direction R, the annular element 20 will be held in its upper load-free position by the sliding friction from the spring 58 and a slight rolling friction from the balls 64 subjected to load from the spring 56, said springs rotating synchronously with the driving part. The clutch is re-engaged as a result of the shoulder or dogging member 70 on the annular element 20 being pressed down between the respective dogging members 18 and 22 on the sleeve 16 and the clutch body 25 by the pressure force F, when rotation ceases and reversal begins. In order that re-engagement of the clutch is able to take place and to ensure that the clutch is therewith self-restoring, it is necessary to adapt the angle of inclination of the ramp 22 such that the annular element 20 can be rotated back to its starting position solely by the spring pressure exerted. Although a smaller ramp angle can be accepted in the case of certain embodiments, re-engagement of the clutch is then ensured by the resistance offerred by the screw tap to rotation in the screw-threaded hole or by the resistance offered by mass forces from members that have ceased to move.

When the clutch is disengaged because a preset thread depth has been reached, the forward feed of the machine spindle is stopped, although the spindle will continue to rotate. The screw tap will then draw the clutch body 25 further forward as indicated by the arrow P, said body having only limited axial movement, but while being pressed, at the same time, against the dogging element 70 on the annular element 20 by the dogging element 18 on the driving part 16, which reduces the tensile force. The intermediate annular element 20 is therewith lifted through the distance Y, until the corner H on the dogging member or shoulder 70 on the annular element 20 reaches a corner on the dogging member or shoulder 18 on the driving part 16. In the next phase of operation, the top surface on the shoulder 18 on the driving part 16 lifts the annular element 20 further while simultaneously conveying the shoulder 70 through the distance X up the ramp 22 on the clutch body 25, until the shoulder lies above the line L, in which position the shoulder has been completely relieved of all torque.

FIGS. 3b and 4b illustrate two important features. When the preset length or depth of screw cut has been reached and the aforedescribed intermediate annular element 20 has been drawn forward through the distance Y by the screw tap and the load relieving phase shall commence, the inner part of the dogging member 70 of said annular element is still in full engagement Z with the dogging member 22 of the driven part 25. As will be seen from the Figures, it is therefore necessary for the annular element 20 to be lifted through further at least the distance Z by the ramp 72 or by the dogging member 18 of the driving part 16, or by the outer part of the dogging member 70 of the annular element 20.

Consequently, the top dogging surface of one or both of the last mentioned dogging members 18, 70 in the screw cutting direction need to have a peak-like configuration or present a continuously rounded configuration which forms with the rotational plane an angle of such small value that when the load relieving phase is commenced, the annular element 20 can be lifted further through the distance Z at a low torque and because the peaked or rounded top surface has a residual elevation which is greater than Z.

In the case of the embodiments illustrated in FIGS. 3a, 3b, 4a and 4b, the transition or junction between the driving surface and the top surface of respective dogging members exhibits sharply defined corners. This configuration affords the best result from the aspect of function. It should be emphasized, however, that both surfaces may be configured to present a single continuously curving surface whose contact angle with the rotational plane is smaller at the top of respective dogging members than at the bottom thereof.

FIG. 5 illustrates an alternative embodiment similar to that of FIGS. 4a and 4b, and shows, by way of example, the configuration of dogging elements which are particularly suited for small units of low mass. The same reference signs as those used in FIGS. 3a and 3b have been used in FIG. 5 to identify components similar to those shown in said Figures. Thus, the FIG. 5 embodiment includes a driving part or sleeve 16 which through its dogging member 18 drives a driven part or guide body 24 with dogging member 22 in the screw-threading direction R via the dogging member 70 of the annular element 20. The dogging member on the annular element 20 has an outer part for effecting both torque driving and torque-disengagement function with respect to the dogging member 18 of the driving part 16, which external or outer dogging members have pointed tops for automatic re-engagement with one another under the influence of clutch spring pressure. Re-engagement is independent of resistance from the screw tap and the mass of non-rotating components (inertia). The annular element 20 has also solely dogging shoulder part with positive abutment in both the driving and the unscrewing directions. Because the illustrated angle α is smaller than the illustrated angle β, the torque generated when unscrewing the tap will be greater than that generated when screwing-in the tap, which provides a safety factor in the case of automated processes. The ratio of these two angles may also be adapted to suitable values when it is desired to incorporate a safety factor against tap fracture when reversing direction, primarily in the case of manually effected screw thread cutting operations. If desired, the two parts of the dogging member 70 of the annular element 20 may also be offset peripherally. An axial abutment, such as shown at A, between the bottom of the annular element 20 and a flange (either whole or partial) on the driven part 24 will result in easy running, sliding friction between the parts so that the dogging members are brought automatically into contact with the drive surfaces.

Figure 6:
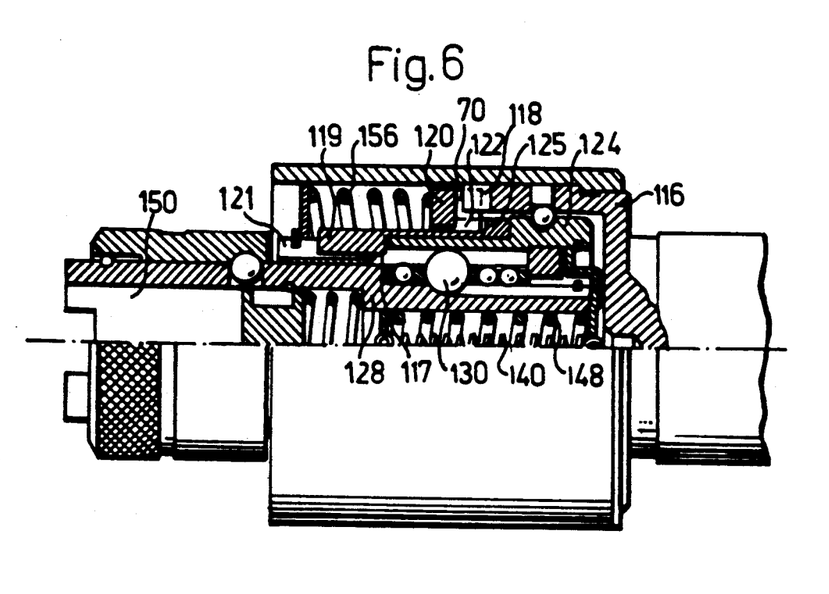
FIG. 6 is a longitudinal section through another embodiment of the inventive clutch arrangement.

FIG. 6 illustrates an embodiment of screw thread cutting apparatus intended solely for thread depth control, i.e. the clutch is disengaged when a preset length of thread has been reached. Similar to the FIG. 1 embodiment, the apparatus illustrated in FIG. 6 has a driving part 116 provided with a dogging member 118 which is coupled to the driven unit via an intermediate annular element 120. The driven unit, or part, comprises a guide body 124 which is axially immovable, and a clutch body 125 which has on one end a dogging member 122 and on the other end is provided with two or more tongues 119 which run in axial grooves 121 in the guide body 124 and which therewith form means for transmitting torque between the parts 125 and 124. Transmission from the guide body 124 to the inner axially movable slide body 128 is effected with the aid of balls 130, in the same manner as that of the embodiment illustrated in FIGS. 1a and 1b, to which reference is also made with regard to the construction of the inner springs 140, 148 and the attachment of the screw tap at 150. The load relieving ramp for disengagement of the clutch is disposed on the driving part 116 and solely clutch spring 156 of relatively low strength is mounted between the annular element 120 and the axially rigid guide body 124 of the driven unit or part. The dogging members or shoulders 118, 122, 70 on the clutch parts are inclined at a small angle such that the clutch will not be disengaged as a result of the torque generated, even though the clutch spring 156 of this embodiment is relatively weak. When forward feed of the machine stops, but rotation continues, the axially movable element 128 moves further in the screw-threading direction, wherewith the balls 130 are brought into abutment with the corners 117 on the respective tongues 119 on the clutch body 125 and dogs the tongues 125, 129 forwards in the screw-threading direction, such that the dogging member or shoulders 122 on the clutch body 125 lift the shoulders 70 on the annular element 20 out of engagement with the shoulders 118 on the driving part 16, as described in the aforegoing with reference to FIG. 3b. When the clutch is disengaged because the preset length of screw thread has been reached, the spring 156 of the FIG. 5 embodiment offers very little resistance. The construction can therefore be made very simple and does not require the provision of setting nuts or screws for adjusting the force exerted by the clutch spring, since these nuts and screws can be replaced with washers and lock rings, which are able to provide a constant spring force, as in the case of the illustrated embodiment.

Figure 7:
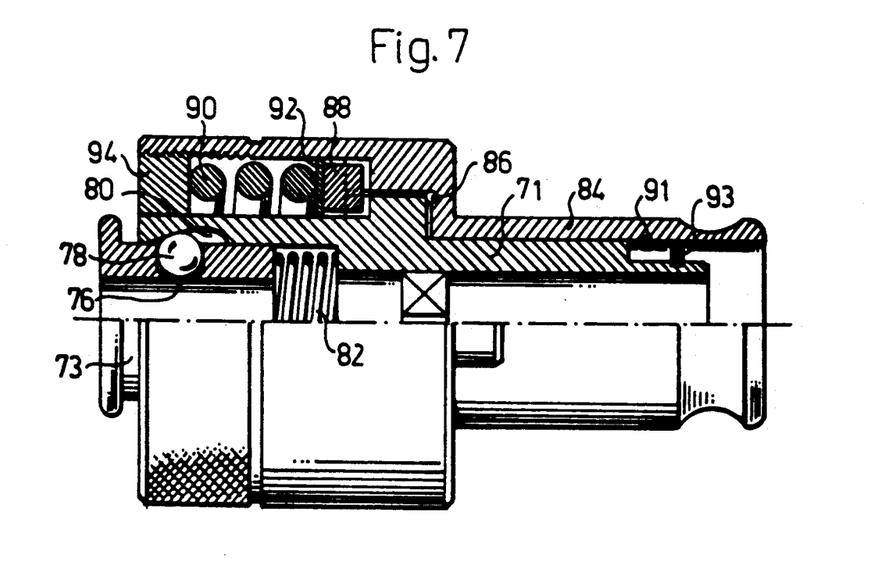
FIG. 7 is a sectional view of still another embodiment of the inventive clutch arrangement.

In FIG. 7 the reference numeral 71 identifies a clutch body which has provided on the left end thereof, as seen in the Figure, a sleeve 73 which is slidably mounted in the body 71 and has provided thereon peripheral grooves or tracks 76 which accommodate latch balls 78 which when the sleeve is moved axially in the clutch body 71 run on a camming surface 80 located on the inner cylindrical surface of said body. In the illustrated position towards which the sleeve 73 is urged by the pressure exerted by a spring 82, the latch balls 78 are guided by the camming surface 80 such that a peripheral part of respective balls projects into the interior of the sleeve 73. This enables the shank of a screw tap (not shown) or like device to be held by friction in the sleeve or socket 73 and rotated together therewith, e.g. with the aid of a square-section driver or the like. When the sleeve 73 is displaced to the right relative to the clutch body 71, the latch balls 78 are able to move outwardly and therewith release the screw tap from the sleeve or socket 73.

The clutch body 71, which forms the driven part of the clutch, is slidably mounted in a surrounding clutch housing 84 which forms the driving part of the clutch and which is mounted for rotational movement and axial thrust relative to the body 71 with the aid of balls 86. A dogging member on an annular element 88 engages corresponding dogging members on the driven clutch body 71 and the driving clutch housing 84. The annular element 88 is held in engagement with the dogging members of these latter clutch components by a clutch spring 90, normally a helical spring. The spring 90 is mounted between the plate or washer 92 and a set screw 94 which is screwed into the driving sleeve 84 and by means of which the spring tension, and therewith the setting of the torque at which the clutch shall disengage, can be changed. When the clutch is disengaged in response to exceeding a preset torque, the driven part 71 will stop whereas the drive sleeve or housing 84 will continue to rotate, wherein the dogging member on the annular element will climb up a ramp, normally disposed on the dogging member of the drive part or housing 84 in the aforedescribed manner (cf. FIG. 3a) so as to disengage the clutch via the annular element 88. Mounted between the annular element 88 and the driven clutch body 71 is a friction element 92 which may have the form of a simple slip plate, as in the case of the FIG. 7 embodiment, or of more complicated construction. The inner peripheral surface of the friction element 92 abuts the driven clutch body 71, with sliding friction therebetween. This friction is adapted so that the annular element 88 will be held in its load-relieved position on the ramp for as long as the driving part continues to rotate, and so that the annular element is dogged safely back into clutch engagement with the dogging members of the driven part 71 and the driving part 84 when rotation of the machine spindle is reversed. When the friction element is made to be properly rotatable in relation to the collaring or abutment spring 90, e.g. through the agency of a thrust ball bearing, the clutch will be self-engaging.

When the load-relief ramp is disposed alternatively on the driven part in accordance with examples 4a and 4b, the friction element 92 is normally omitted.

When the clutch is disengaged as a result of reaching a preset depth of thread, forward feed is stopped, but rotation continues, and the body is drawn forwards in the screw-threading direction, by sliding in the clutch housing 84 against the force exerted by the spring 90, said force being reduced by the torque drive. The dogging members on the driving clutch housing 84 will therewith lift the annular element 88, and thus also its dogging member, out of engagement with the dogging members on the body 71, as described with reference to FIG. 3b, such as to be fully relieved of torque and axial forces. Movement of the body 71 relative to the surrounding clutch housing 84 is restricted by two stop rings 91 and 93 arranged on the right-hand of these elements. The distance between the stop rings 91 and 93 shall be sufficient to bring the dogging member of the annular element out of engagement with the dogging members on the driving part, as described with reference to FIG. 3b.

Figure 8:
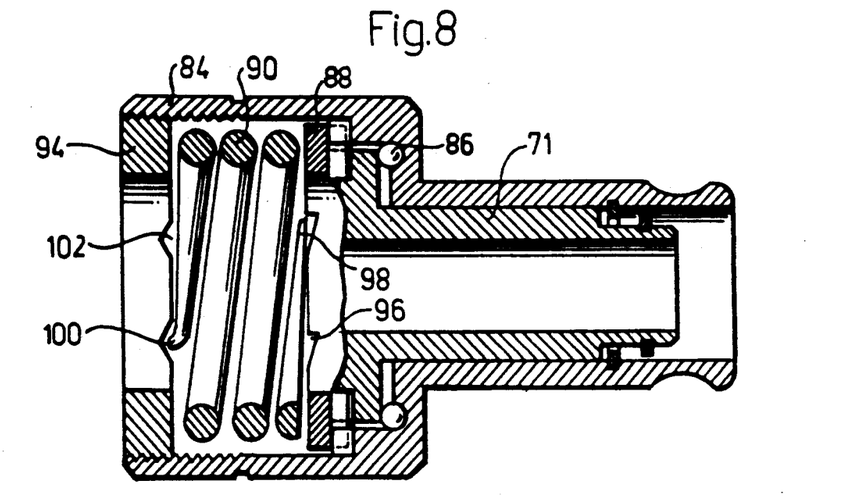
FIG. 8 is a sectional view of a further embodiment which incorporates an alternative clutch spring bearing.

FIG. 8 illustrates an alternative embodiment which provides an additional assurance that the clutch will be re-engaged when rotation of the machine spindle is reversed. This embodiment is particularly suited for use with unmanned, fully automatic machines. The reference signs used in the FIG. 7 embodiment are also used in the FIG. 8 embodiment to identify corresponding components, although the sleeve 73 has been omitted in this latter case for the sake of simplicity. Thus, FIG. 8 illustrates the clutch body 71, which is partially cut away in the Figure, the driving sleeve or housing 84, and the spring 90 disposed between the intermediate annular element 88 and the set screws 94. The surface of the annular element which is in abutment with the clutch spring 90 incorporates small notches 96 which present an acute angle to the rotational plane in the clutch re-engaging direction of the annular element and an obtuse angle to said plane in the clutch-disengaging or load-relieving direction of said element. The clutch spring 90, which in the illustrated case is a helical spring, rotates synchronously with the driving part 84 and when the annular element ceases to rotate in response to disengagement of the clutch, the tip end 98 of the spring 90 will smoothly slide over the notches 96, provided that the driving part 84 continues to rotate in the screw-threading direction. This tip end 98 of the spring may be ground down, but is also cut-off at right angles.

As beforementioned, the other end 100 of the clutch spring 90 abuts the flat set screw 94 by means of which the torque is preset. The abutment surface of the set screw 94 also incorporates notches or indentations 102 which present an inclined surface in both the screw-threading and the unscrewing direction. The outermost point or tip of the spring end 100 is preferably curved slightly and extends into the notches 102. The resistance in these notches 102 between the spring 90 and the screw 94 is therefore greater than the slide resistance between the spring 90 and the annular element in the inward driving direction. In the reverse direction the resistance is quite sufficient to return the annular element 88 from its load-relieving position to its driving position, via the spring 90 and the positive engagement of the end 98 of said spring with the notches 96 in the annular element in said reverse direction. The resistance, however, is not so great as to prevent the engaging force to be set readily by rotating the screw. The arrangement can be the reverse of that described, such that the set screw 94 will have the positive drive notches, corresponding to the notches 96, in the clutch re-engaging position and the annular element has the notches corresponding to the notches 102 with a respective sloping surface in both of said directions. The arrangement first described, however, has the advantage that only a small rotational mass needs to be stopped when disengaging the clutch, and the heat generated by sliding friction has a longer path to travel, i.e. through the entire length of the wire in the spring 90. Clutch disengagement encompasses only a fraction of a complete screw thread cutting cycle. Consequently, as a result of the long length of this heat conducting path, the thermal energy will disperse smoothly to atmosphere and to other machine parts and will not manifest itself on the tool surface normally gripped by the machinist.

The aforedescribed effect afforded by the various notches or indentations 96, 102 can also be achieved advantageously through the surface fineness or smoothness of the components concerned, i.e. the surfaces of the annular element 88, the abutment surfaces of the spring 90 and the abutment surfaces of the spring 90 and the abutment surface of the set screw 94. For instance, if the annular element has a fine abutment surface and the surfaces of the spring 90 which abut respectively the annular element 88 and the set screw 94 are coarse and the surface of the set screw 94 in abutment with the spring 90 is also coarse or rough, the spring 90 will always slide against the annular element so as to ensure reliable disengagement of the clutch. The spring 90 may also be made reversible, so as to ensure that it can not be fitted wrongly in the apparatus. Although the margins allowed in the clutch re-engagement procedure are not very large, they are nevertheless sufficient, provided that the remainder of the procedure is correctly implemented.

Figure 9A:
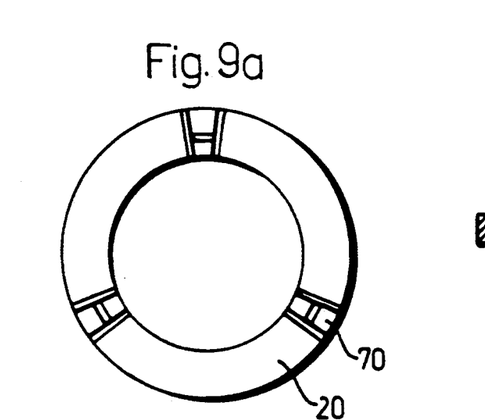
FIG. 9a is a plan view and FIG. 9b a side view of an annular element used in the clutch.
Figure 9B:
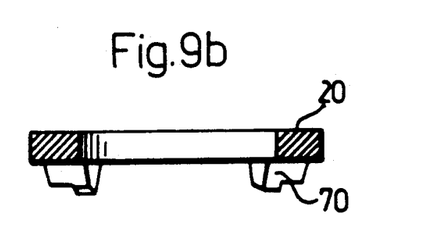

FIG. 9a illustrates in plan view and FIG. 9b in side view an annular element 20 with dogging member 70 which is capable of being used in the embodiments previously described.

Figure 10:
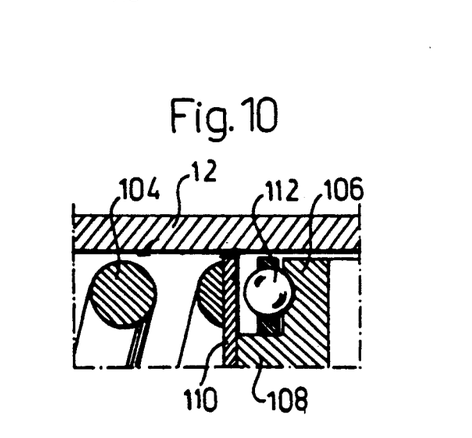
FIG. 10 is a sectional view, in larger scale, of an alternative arrangement for seating the clutch spring against the annular element.

FIG. 10 illustrates a further embodiment of an arrangement for reducing the friction acting between the clutch spring and the annular element to a desired level in those cases when it is preferred to have only one, powerful clutch spring, e.g., in a compact adapter intended for large thread dimensions. This embodiment includes a clutch sleeve 12 of the same kind as that of the FIG. 1 embodiment. Arranged in the sleeve is a clutch spring 104 the turns of which are directed in the screw-threading direction and an annular element 106 which internally has a flange 108 which projects out over the annular element. The spring 104 presses against a relatively thin plate or washer 110, which although hard is springy. When the tension in the clutch spring 104 is low, the plate 110 is in contact only with the inner flange 108 of the annular element 106 and solely sliding friction will occur when the clutch is disengaged. When the spring 104 is placed under greater tension, the plate 110 will yield resiliently and take a slightly conical configuration and come into contact with a ball bearing 112 located between the flange 108 on the annular element 106 and the outer sleeve 12. This will prevent the sliding friction from becoming greater, and the increase in pressure from the spring 104 will be taken up by the ball bearing 112.

In the case of the FIG. 1 embodiment, the spring means which loaded the annular element 20 into corresponding engagement with the dogging members on the driving and driven apparatus parts comprised two helical springs 56, 58, of which one, 56, is more powerful than the other, 58. It will be seen from FIG. 1 that the more powerful spring 56 is mounted on the annular or clutch element 20 through ball bearings 62, 64, whereas the less powerful spring 58 is mounted directly on the element 20. The less powerful spring 58 may also be longer than the more powerful spring 56, thereby enabling the clutch to be loaded with a small force in the lower range of the capacity of the apparatus and thereby being highly sensitive or responsive to conditions which prevail when using small screw taps, where the risk of fracture is greatest.

It will be understood that the described and illustrated embodiments are only examples of the invention and that these embodiments can be modified and changed within the scope of the following claims.

I claim:

1. An arrangement in screw thread cutting apparatus comprising a driving part, a driven part and a clutch element intermediately disposed between said driving part and said driven part, said driven part including driven part torque transmitting means, said driving part including driving part torque transmitting means and said clutch element including clutch element torque transmitting means, the clutch element torque transmitting means being engageable with the torque transmitting means of both the driving part and the driven part, the clutch element further including resilient means urging said clutch element into driving engagement with said driving part and said driven part, said resilient means being adjustable to be responsive to torque generated by operation of said screw thread cutting apparatus, said torque transmitting means of said driven part and said driving part torque transmitting means including means for moving said clutch element torque transmitting means and said driven part torque transmitting means out of engagement with each other against a force by said resilient means by an axial displacement of said clutch element at a preset value of said force exerted by said adjustable resilient means corresponding to a preset value of torque generated by operation of said screw thread cutting apparatus, said driven part torque transmitting means being moveable to disengage from said torque transmitting means of said clutch element upon reaching of a preset thread length.

2. The invention as set forth in claim 1, wherein said driven part includes at least one member for holding a tap and a driver member engageable therewith and engageable with said clutching section torque transmitting means, said tap holder member and said driver member being connected by driver member spring means, the axial position of the tap holder member relative to the driver member of said driven part being determined by at least one spring means, said at least one spring means being adjustable to vary the relative positions of said tap holder member and said driver member, for adjustment of the length of de-clutching travel.

3. The invention as set forth in claim 2 wherein said at least one spring means position is defined by adjustment means.

4. The invention as set forth in claim 3, wherein said clutch section of said driven part is axially displaceable out of driving engagement in response to motion of torque transmitting between said clutch section and said spindle member of said driven part.

5. The invention as set forth in claim 1, wherein said clutch element comprises an annular element having at least one dogging member and wherein said driven part includes at least one clutching section, said driven part torque transmitting means being connected to said driven part clutching section.

6. The invention as set forth in claim 5 wherein said torque transmitting means of the driven part is axially displaceable from said torque transmitting means of said clutch element in response to forward threading motion of the driven part after a preset thread depth has been reached.

7. The invention as set forth in claim 5, wherein said at least one dogging member of said clutch element has a part with a rounded top.

8. The invention as set forth in claim 5, wherein said at least one dogging member comprises at least one rigid clutch tooth.

9. The invention as set forth in claim 5, wherein said clutch element is axially displaceable in response to relative motion of the driven part, such as to move out of engagement with the driven part, thereby interrupting the torque transmission to the driven part.

10. The invention as set forth in claim 5 wherein said at least one dogging member of the clutch element is engageable with the torque transmitting means of the driving part and the torque transmitting means of the clutching section of the driven part.

11. The invention as set forth in claim 10, wherein the surface of said at least one dogging member on the clutch element has at least two parts with inclinations to the rotational direction for achieving transfer to the torque release position and for return to driving engagement.

12. The invention as set forth in claim 10 wherein said at least one dogging member on at least one of said driving part and said driven part is connected to ramp means along which said at least one dogging member of the clutch element is arranged to be movable against a spring force from said resilient means, such as to move out of engagement with said torque transmitting means of said other part of said driving part and said driven part.

13. The invention as set forth in claim 12, wherein the top shape of the at least one dogging member of the clutch has a plane with an angle of inclination to the rotational direction such that the clutch element is moveable upon the ramp means during disengagement when driving forward and provides release for reengagement when driving in reverse.

14. The invention as set forth in claim 12 wherein the torque transmitting means of the driving part are in the form of at least one dogging member of the driving having a rounded top which is inclined to the rotational direction of said driving member for engagement with said at least one dogging member of the clutch element in the reversing/reengaging direction.

15. The invention as set forth in claim 12, wherein said torque transmitting means on said driving part and said driven part and on said clutch element have mutally cooperating contact surfaces which form a total force component which substantially cancels out the force of said resilient means when said predetermined torque is reached.

16. The invention as set forth in claim 15, wherein said at least one dogging member on said clutch element has a top portion having a surface with an angle of inclination corresponding to the angle of inclination of the ramp means for facilitating displacement along the ramp means for disengaging said at least one dogging member and reengagement to the driving position.

17. The invention as set forth in claim 12, the ramp means has stop means adjacent a longitudinal end thereof.

18. The invention as set forth in claim 17, wherein the spring means is adjustable to provide different spring forces and is mounted between the driven part and the clutch element.

19. The invention as set forth in claim 18, wherein said clutch element defines at least one recess with which an adjacent spring is engageable.

20. The invention as set forth in claim 18, wherein the clutch element is held disengaged by the end surfaces of the spring means acting against the clutch element.

21. The invention as set forth in claim 20, wherein the clutch element spring means comprises a helical spring.

22. The invention as set forth in claim 21, wherein the clutch spring means includes at least two concentric helical springs, one of which is more powerful than the other.

23. The invention as set forth in claim 22, wherein the more powerful spring is mounted against the clutch element by bearings, and the less powerful spring is mounted directly against the clutch element.

24. The invention as set forth in claim 23, wherein said clutch element includes at least one recess having a configuration such that one end of the spring means is engageable with said at least one recess for reengagement of the clutch.

25. The invention as set forth in claim 24, wherein a spring setting screw is provided with at least one recess with which an adjacent spring is engageable.

26. The invention as set forth in claim 25, wherein said spring setting screw as at least one recess having a configuration such that an end of the spring is engageable with said at least one recess for re-engagement of the clutch.

27. The invention as set forth in claim 22, wherein the clutch springs are adjustable.

28. The invention as set forth in claim 27, wherein an axial abutment is provided between the clutch element and the driven or driving part.

29. The invention as set forth in claim 28, wherein said driving part includes a drive spindle member and a sleevelike part which has detachably mounted therein a sleeve which carries at least one dogging member on its forward end.

30. The invention as set forth in claim 29, wherein the clutch spring means has a winding direction which is the same as the thread cutting direction.

31. The invention as set forth in claim 30, at least one contact surface of the at least one dogging member of said clutch element have a convex shape for providing relatively large driving force when the at least one dogging member is in driving engagement and a relatively low driving force for relieving load and reengaging the clutch engagement and relatively low driving force for relieving load and reengaging the clutch.

* * * * *